(12) United States Patent
Belliard

(10) Patent No.: US 10,549,459 B2
(45) Date of Patent: *Feb. 4, 2020

(54) EJECTION DEVICE COMPRISING A CHAIN OF SLIDING LINKS

(71) Applicant: FAURECIA INTERIEUR INDUSTRIE, Nanterre (FR)

(72) Inventor: Sylvain Belliard, Rouillon (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 253 days.

This patent is subject to a terminal disclaimer.

(21) Appl. No.: 15/442,575

(22) Filed: Feb. 24, 2017

(65) Prior Publication Data

US 2017/0246771 A1    Aug. 31, 2017

(30) Foreign Application Priority Data

Feb. 26, 2016 (FR) ...................................... 16 51639

(51) Int. Cl.
*B29C 37/00* (2006.01)
*B29C 45/40* (2006.01)

(52) U.S. Cl.
CPC ........ *B29C 37/0003* (2013.01); *B29C 45/401* (2013.01); *B29C 45/4005* (2013.01)

(58) Field of Classification Search
CPC .............. B29C 45/401; B29C 45/4005; B29C 37/0003; B29C 33/442
See application file for complete search history.

(56) References Cited

U.S. PATENT DOCUMENTS

| | | | | |
|---|---|---|---|---|
| 3,290,724 A | * | 12/1966 | Rondum | B29C 33/442 425/444 |
| 3,736,092 A | * | 5/1973 | Konig | B29C 45/681 425/451.6 |
| 4,206,799 A | * | 6/1980 | McDonald | B22D 17/2236 164/341 |
| 5,240,719 A | * | 8/1993 | Hedgewick | B29C 33/485 425/441 |
| 5,536,161 A | * | 7/1996 | Smith | B29C 33/444 249/58 |
| 5,695,421 A | * | 12/1997 | Fukuda | B62M 9/1242 474/82 |

(Continued)

FOREIGN PATENT DOCUMENTS

| | | |
|---|---|---|
| JP | H0671703 A | 3/1994 |
| JP | H06328533 A | 11/1994 |

OTHER PUBLICATIONS

French Search Report in French for application No. FR1651639, dated Nov. 11, 2016, 2 pages.

*Primary Examiner* — Nahida Sultana
(74) *Attorney, Agent, or Firm* — Reising Ethington P.C.

(57) ABSTRACT

The ejection device comprises:
a pushing device (14) translatable along a first axis (A1) between a retracted position and an ejection position,
an ejection element (28) translatable along a second axis (A2) between a retracted position and an ejection position,
a transfer device (26) connecting the pushing device (14) and the ejection device (28).
The transfer device (26) comprises at least two links (44), translatable relative to one another and relative to the pushing device (14) and the ejection element (28).

20 Claims, 10 Drawing Sheets

(56) References Cited

U.S. PATENT DOCUMENTS

Figure 1:
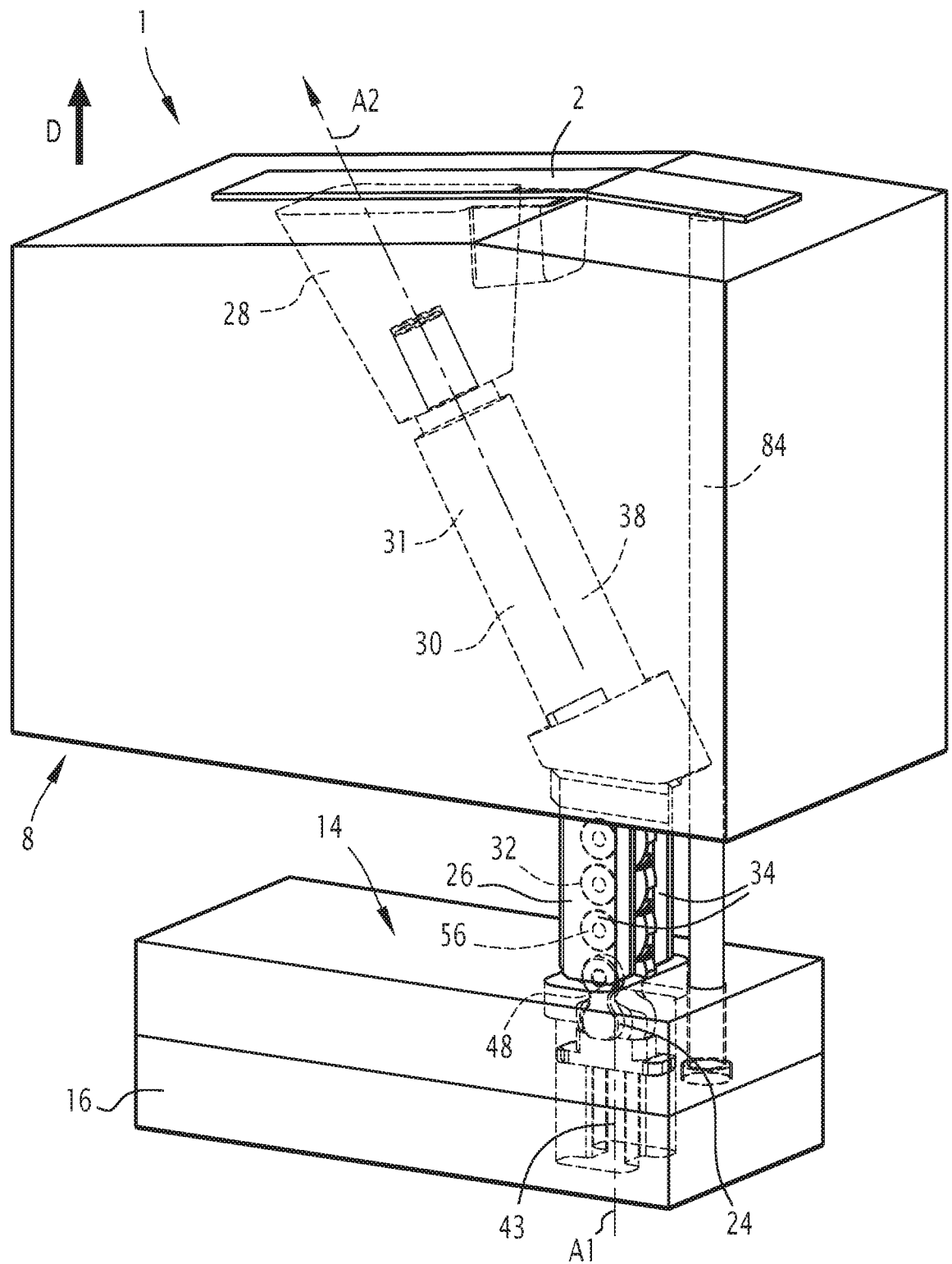

| | | | | |
|---|---|---|---|---|
| 5,908,597 A * | 6/1999 | Boudreau | ............... | B29C 45/32 |
| | | | | 264/297.2 |
| 6,171,542 B1 * | 1/2001 | Struble | ................ | B29C 33/442 |
| | | | | 264/334 |
| 2005/0042322 A1 * | 2/2005 | Takao | .................... | B29C 45/44 |
| | | | | 425/443 |
| 2005/0280188 A1 * | 12/2005 | Cecchin | ............. | B29C 45/4005 |
| | | | | 264/334 |
| 2007/0243286 A1 * | 10/2007 | Wang | ................. | B29C 45/4005 |
| | | | | 425/577 |
| 2008/0179793 A1 * | 7/2008 | Schad | ................ | B29C 45/4005 |
| | | | | 264/334 |
| 2009/0304850 A1 * | 12/2009 | Drewlies | ............ | B29C 45/4421 |
| | | | | 425/556 |
| 2010/0221379 A1 * | 9/2010 | Takao | ................ | B29C 45/4435 |
| | | | | 425/443 |
| 2014/0061973 A1 * | 3/2014 | Bourgaut | ........... | B29C 45/1759 |
| | | | | 264/328.1 |
| 2016/0375617 A1 * | 12/2016 | Hutter | ............... | B29C 45/14336 |
| | | | | 425/116 |
| 2017/0246770 A1 * | 8/2017 | Belliard | ............. | B29C 37/0003 |
| 2019/0126527 A1 * | 5/2019 | Sorimoto | ............... | B29C 45/26 |

* cited by examiner

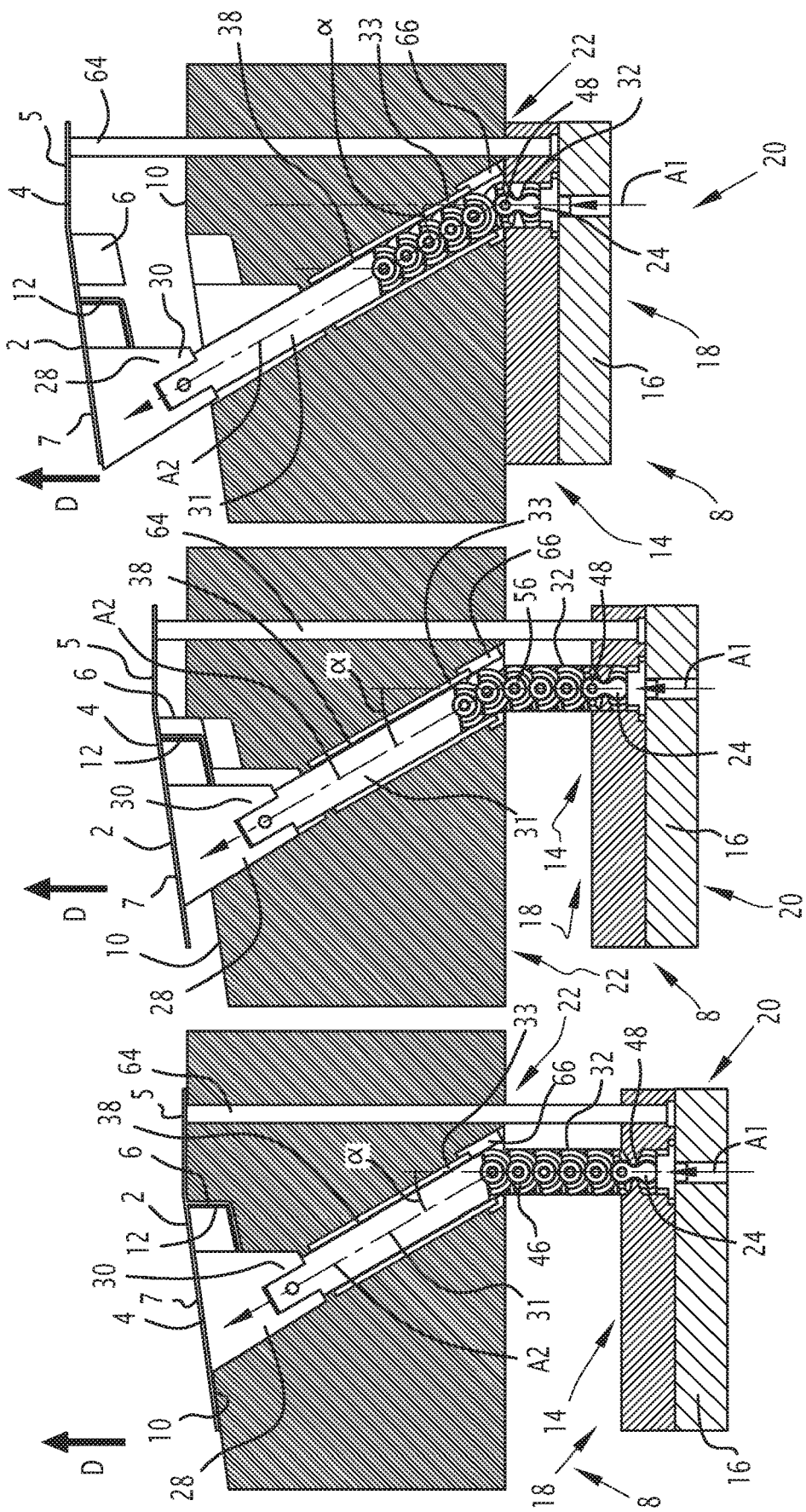

EJECTION DEVICE COMPRISING A CHAIN OF SLIDING LINKS

The present invention relates to an ejection device for a mold used to produce a molded part in a molding cavity intended to allow the ejection of the molded part outside said molding cavity, said device comprising:
- a pushing device translatable along a first axis between a retracted position and an ejection position,
- at least one ejection element translatable along a second axis, different from the first axis, between a retracted position and an ejection position,
- at least one transfer device connecting the pushing device and the ejection element, said transfer device being arranged to move the ejection element along the second axis between its retracted position and its ejection position when the pushing device is moved along the first axis between its retracted position and its ejection position.

In a mold for producing a molded part, such as an injection mold, the molded part is removed from the mold, for example using a gripping tool, when the molding cavity is opened. In order to facilitate this removal, it is provided to separate the molded part from the part of the mold on which the molded part rests using an ejection device.

Such an ejection device generally comprises an ejection plate, movable in a hollowed out space of the part of the mold in a direction corresponding to the ejection direction of the part, and one or several ejection rods secured to the ejection plate and emerging in the wall of the part of the mold against which the molded part is applied. By moving the ejection plate in the ejection direction, the ejection rods push the molded part so as to separate it from the wall of the part of the mold, which allows the subsequent removal of the molded part. The use of several rods is particularly interesting when the molded part has a large surface area, since these rods can be distributed on this surface in order to push the part into different areas thereof and avoid deformations and/or breaks of the part during its ejection. Using an ejection plate makes it possible to move all of the rods at the same time using a single actuating device of the ejection plate.

However, in such an ejection device, the rods are movable only in a single ejection direction, which limits the possibilities for ejection paths. Such a limitation may be problematic for parts having complex shapes, for example when these parts are not planar and have areas extending in one or several planes different from a plane perpendicular to the ejection direction or when they comprise elements extending protruding in a direction different from the ejection direction.

Furthermore, for parts having complex shapes, such as an undercut part, simply ejecting the part outside the mold does not make it possible to strip the undercut part. To strip this part, it is known to use a drawer moving in the molding cavity between the molding position, in which the drawer defines the shape of the undercut zone with the molding cavity, and a retracted position, in which the drawer is removed from the undercut area and allows the part to be ejected from the molding cavity.

Ejecting such a part therefore requires an operation to actuate the drawer and an operation to eject the part, which increases the cycle time of the mold and makes the structure of the mold more complex.

One of the aims of the invention is to overcome these drawbacks by proposing an ejection device offering greater freedom in terms of layout while being less cumbersome and further allowing a drawer to be removed from an undercut area during the ejection of the part.

To that end, the invention relates to an ejection device of the aforementioned type, wherein the transfer device comprises at least two links, translatable relative to one another and relative to the pushing device and the ejection element.

The transfer device makes it possible to modify the ejection direction of the ejection element by choosing a second axis that is inclined relative to the first axis. Thus, as an example, the ejection device may comprise one ejection rod ejecting the part along a first axis and another ejection rod forming the ejection element and ejecting the part along the second axis, which makes it possible to eject parts with complex shapes. Furthermore, by providing a molding surface at the end of the ejection element, for example to form an undercut portion on the molded part, this molding surface can be disengaged from the undercut during the movement of the second rod between its retracted position and its ejection position. Thus, actuating the ejection device further makes it possible to strip a portion of the molded part.

According to other features of the ejection device according to the invention:
- the transfer device comprises a guide element receiving said links, said links being moved along a movement path in said guide element by the pushing device and moving the ejection element, said links being guided in said guide element over the entire movement path;
- the guide element comprises at least two opposite walls each extending over the movement path;
- the links comprise two opposite guide surfaces, said guide surfaces respectively being in permanent contact with an opposite wall of the guide element over the entire movement path such that the links are guided in said guide elements over the entire movement path;
- the links are identical to one another;
- the second axis forms a non-zero with the first axis;
- each link comprises a first sliding surface forming a translation surface with a first adjacent link and a second sliding surface forming a translation surface with a second adjacent link;
- each sliding surface forms an angle relative to a direction perpendicular to the first axis, said angle being negative to delay the movement of the ejection element relative to the pushing device or positive to accelerate the movement of the ejection element relative to the pushing device or zero to move the ejection element and the pushing device at the same speed;
- the ejection element comprises a secondary molding surface arranged to form part of the molding cavity and to mold a portion of the molded part, the movement of the ejection element in the ejection position causing the separation of the secondary molding surface from the portion of the molded part molded by said secondary molding surface; and
- the pushing device comprises an ejection plate translatable along a direction parallel to the first axis, said ejection device further comprising an ejection rod secured to the ejection plate and arranged to move the molded part along said direction parallel to the first axis.

The invention also relates to a mold comprising a first mold part and a second mold part movable relative to one another between an open position, in which the second mold part is separated from the first mold part, and a closed position, in which the first and second mold parts define a molding cavity between them assuming the shape of the part to be molded, said mold comprising an ejection device as described above integrated into the first mold part, the ejection element forming part of the molding cavity in the retracted position and extending protruding from the first mold part along the second axis in the ejection position.

Figure 5:
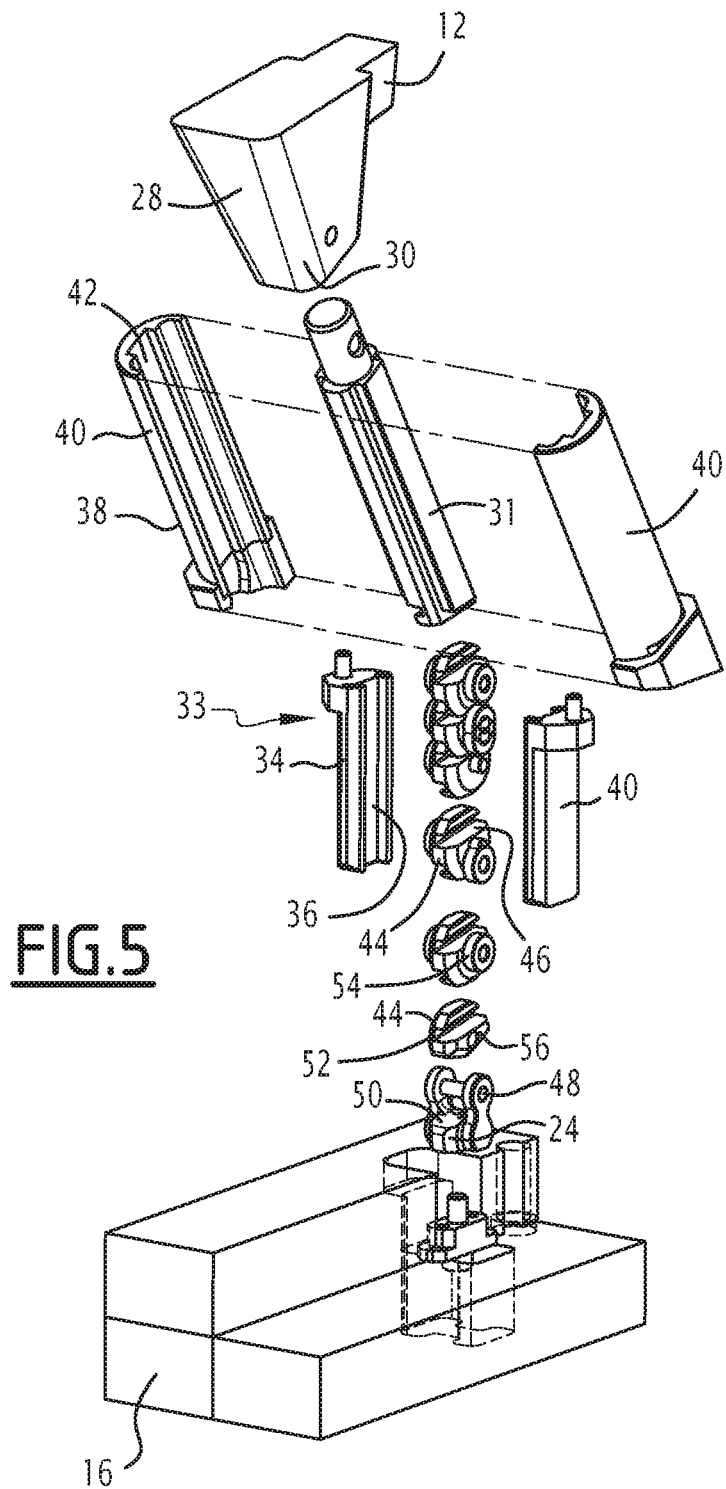
Figure 6:
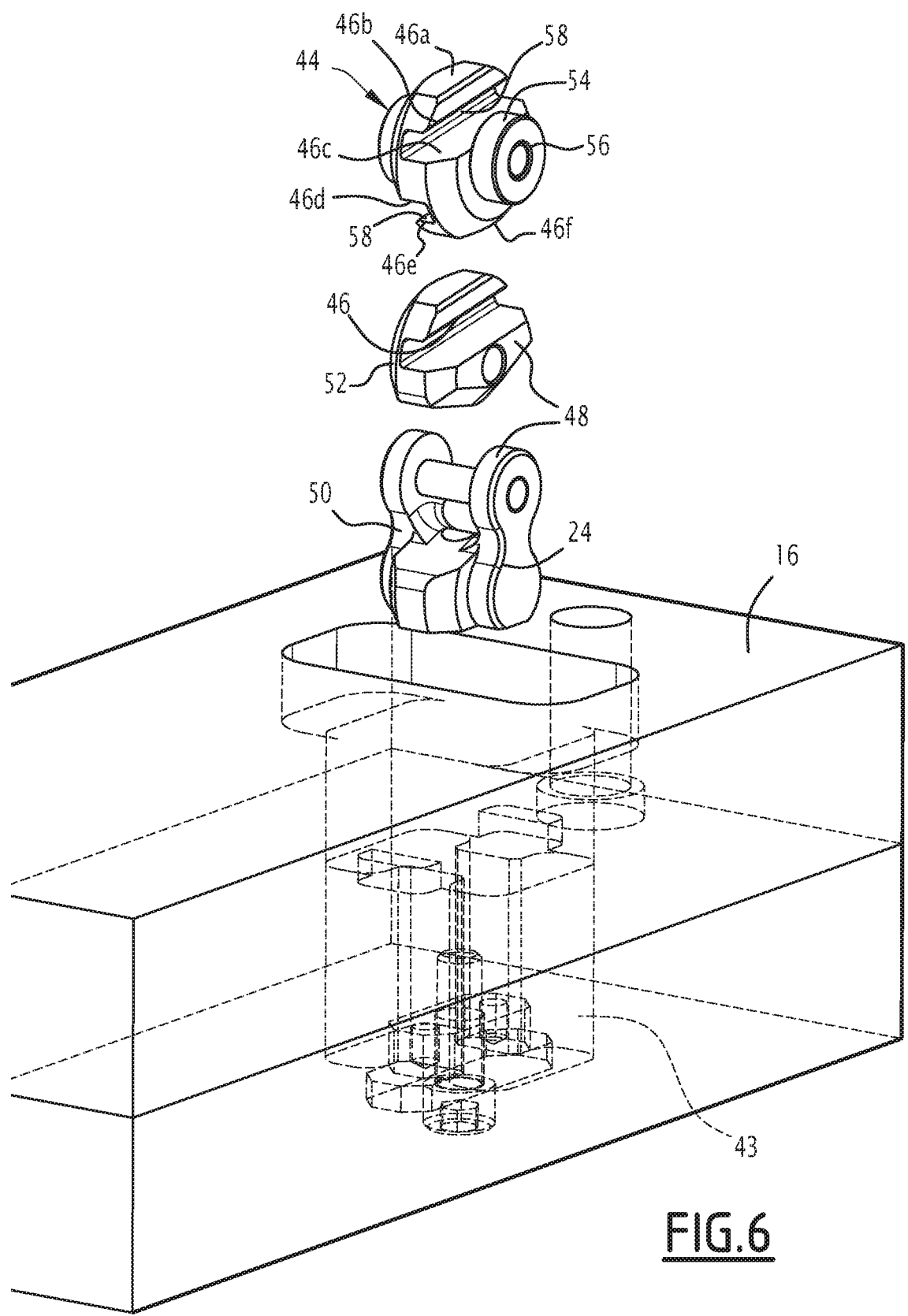
Figure 7:
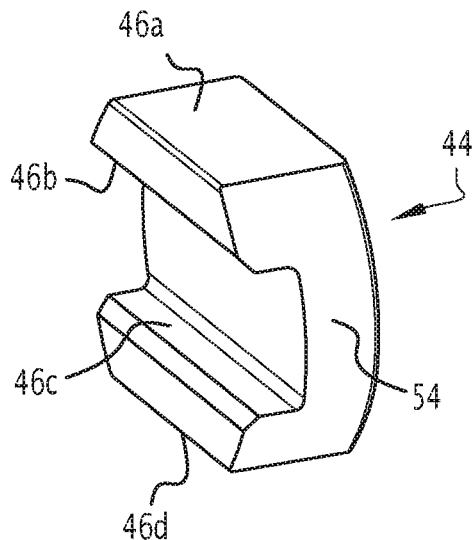
Figure 9:
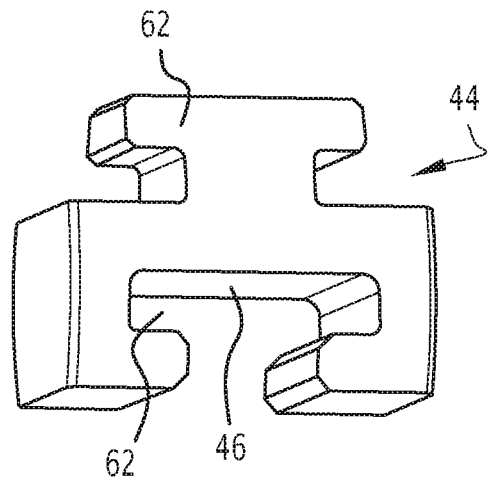
Figure 8:
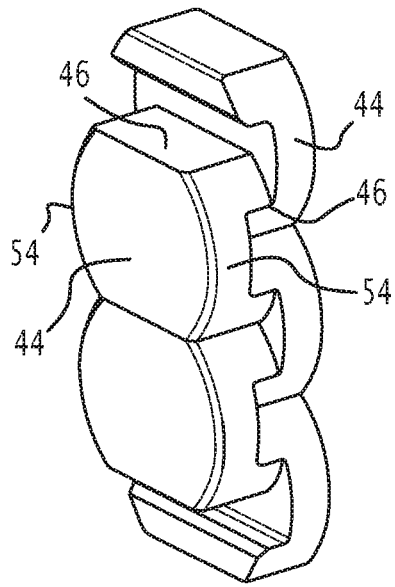
Figure 10:
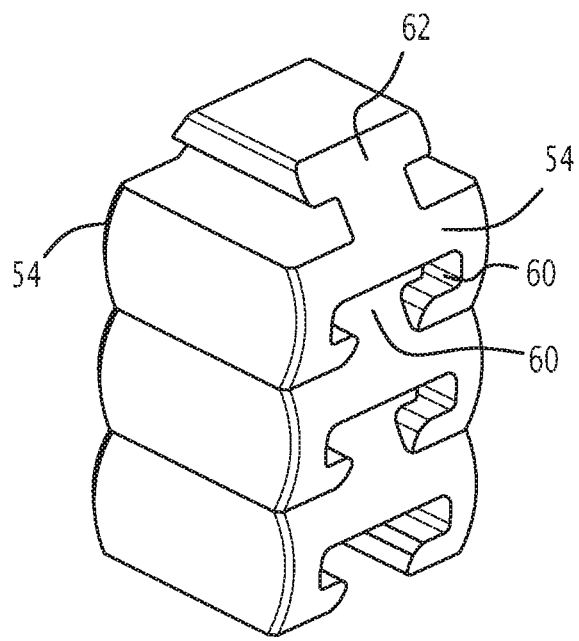

Other aspects and advantages of the invention will appear upon reading the following description, provided as an example, and done in reference to the appended drawings, in which:

FIG. 1 is a diagrammatic perspective illustration of a first mold part comprising an ejection device according to one embodiment of the invention, said device being in the retracted position, FIG. 2 is a diagrammatic sectional illustration of the first part of the mold of FIG. 1, FIG. 3 is a diagrammatic sectional illustration of the first part of the mold of FIG. 2, the ejection device being in an intermediate position between the retracted position and the ejection position, FIG. 4 is a diagrammatic sectional illustration of the first part of the mold of FIG. 2, the ejection device being in the ejection position, FIG. 5 is a diagrammatic exploded perspective illustration of the ejection device according to one embodiment of the invention, FIG. 6 is a diagrammatic illustration of part of the ejection device of FIG. 5, and FIGS. 7 and 9 are diagrammatic perspective illustrations of links according to different embodiments of the ejection device according to the invention, FIGS. 8 and 10 are diagrammatic perspective illustrations of the assembly of the links shown diagrammatically in FIGS. 7 and 9, and FIGS. 11 to 15 are diagrammatic sectional illustrations of the first mold part, the ejection device being in the retracted position, and showing different movement paths of the ejection device.

In reference to FIG. 1, a mold 1 is described for producing a molded part 2 that may have any shape suitable for being molded. Such a mold 1 is for example an injection mold, a compression mold, a foaming mold or the like. More generally, a mold makes it possible to give the desired shape to a material arranged in a molding cavity having the desired shape.

The molded part 2 is for example a motor vehicle part or the like. More particularly, according to the embodiment shown in the figures, the molded part 2 comprises a main surface 4 and an undercut portion 6 relative to the main surface, i.e., a portion comprising at least one surface that cannot be stripped by simply separating two mold parts and that requires an additional molding element able to be moved in a direction different from the separating direction of the two mold parts.

The production mold 1 comprises a first part 8 and a second part (not shown in order to simplify the figures), movable relative to one another between an open position, in which the first and second parts are separated from one another, and a closed position, in which the first and second parts are close to one another so as to define a closed main molding cavity. The main molding cavity has a shape complementary to the main surface 4 of the molded part to be produced. The movement from the closed position to the open position is done along an opening direction D, shown in the figures. The first part comprises a molding surface 10 defining, with a molding surface of the second part, the main molding cavity when the first and second parts are in the closed position.

The main surface 4 is such that it can be separated from the molding surface 10 by moving the molded part 2 in a single ejection direction, for example parallel to the opening direction D. Consequently, the main surface 4 is not necessarily planar and may have any shape allowing stripping by moving the molded part 2 in the ejection direction. Thus, according to the embodiment shown in the figures, the main surface 4 comprises a first portion 5 substantially perpendicular to the opening direction D and a second portion 7 inclined relative to the first portion 5. It should be noted that the main molding cavity could also be arranged to form elements protruding from the main surface 4, for example ribs, while these elements may also be separated from the main molding cavity by moving the molded part 2 in the ejection direction.

According to the embodiment shown in the figures, the main molding cavity is in fluid communication with a secondary molding cavity defined by the molding surface 10 of the first part and a complementary molding surface 12 supported by the ejection device according to the invention, as will be described later. The complementary molding cavity has a shape complementary to the undercut portion 6 of the molded part. The main molding cavity and the complementary molding cavity together form the molding cavity of the production mold 1.

The production mold 1 is for example an injection mold arranged to inject a plastic material at a predetermined pressure in the molding cavity. To that end, the production mold 1 comprises all of the means making it possible to perform and control this injection and the formation of the part, such as one or several injection nozzles for the plastic material, means for regulating the temperature of the molding cavity, means for actuating and moving the first and second parts of the production mold 1, etc. Such means being known, they will not be described in more detail here.

The production mold 1 comprises an ejection device arranged to facilitate the removal of the molded part 2 from the production mold 1 after it has been produced. Once the molded part 2 has been produced, the first and second parts of the mold are moved into the open position. The molded part 2 is then found against the molding surface 10 of the first part 8, as shown in FIGS. 1 and 2, and the ejection device is arranged to separate the molded part 2 from the molding surface 10, as shown in FIG. 4, in order to allow the molded part 2 to be grasped to remove it from the mold. It should be noted that the ejection device can be actuated during the opening of the mold 1 such that the ejection of the molded part 2 does not necessarily begin when the mold is already in the open position.

The ejection device comprises a pushing device 14 movable in the first part 8 along a first axis A1 between a retracted position, shown in FIGS. 1 and 2, and an ejection position, shown in FIG. 4. The first axis A1 extends in the ejection direction and is for example substantially parallel to the opening direction D such that, in the ejection position, the molded part 2 is separated from the molding surface 10 in the space between the first part 4 and the second part of the mold.

The pushing device 14 comprises at least one ejection plate 16 arranged, translatably along the first axis A1, in a space 18 of the first part 8. In the retracted position, the ejection plate 16 is arranged in an upstream part 20 of the space 18, i.e., the part of the space 18 furthest from the molding surface 10, and in the ejection position, the ejection plate 16 is arranged in a downstream part 22 of the space 18, i.e., the part of the space 18 closest to the molding surface 10.

The pushing device 14 further comprises an actuating element 24 secured in movement with the ejection plate 16. The actuating element 24 is connected to a transfer device 26 in turn connected to an ejection element 28.

The ejection element 28 is movable along a second axis A2, different from the first axis A1. According to the embodiment shown in the figures, the ejection element 28 is a moving block bearing the complementary molding surface 12. Thus, in the retracted position, the block is arranged in the first part such that the complementary molding surface 12 extends opposite the molding surface 10 of the first part and defines the complementary molding cavity therewith. The ejection element 28 further comprises an actuating end 30. The ejection element 28 further comprises an actuating rod 31 connected, by its downstream end, to the actuating end 30 of the moving block and extending along the second axis A2. The upstream end of the actuating rod 31 is in turn connected to the transfer device 26, as will be described later. It should be noted that the actuating rod 31 could be made in a single part with the moving block. However, providing a moving block and an actuating rod 31 that are made in two separate parts makes it possible to improve the adaptability of the ejection element 28 to different molds, as will be described later.

The second axis A2 forms an angle α with the first axis A1. The value of the angle α is chosen based on the shape of the molded part. More particularly, in the event the molded part comprises an undercut portion 6, the angle α depends on the distance necessary to remove the moving block from the undercut portion 6 during the ejection of the molded part 2, as will be described later.

Thus, the ejection element 28 is movable between a retracted position and an ejection position, respectively when the pushing device 14 is in the retracted position and in the ejection position via the transfer device 26, which is arranged to convert the movement of the pushing device 14 along the first axis A1 into movement of the ejection element 28 along the second axis A2, as will now be described.

The transfer device 26 comprises a guide element 33 extending in the first part 4 of the mold from the space 18 to the molding surface 10 along a path extending along the first axis A1 in the space 18 and along the second axis A2 in the part of the first mold part 4 extending between the space 18 and the molding surface 10. The guide element 33 comprises a first segment 32, for example formed by two first profiles 34, extending in the space 18 along the first axis A1 and defining, for example between the two first profiles 34, a first guide groove, or guideway, 36, as shown in FIG. 5. The guide element 33 also comprises a second segment 38, for example formed by two second profiles 40, extending in the first part 4 between the space 18 and the molding surface 10 along the second axis A2 and defining, for example between the two second profiles 40, a second guide groove, or guideway, 42, as shown in FIG. 5. The guide grooves 36, 42 are defined by at least two opposite walls of the profile 34, 40. These opposite walls extend along the first axis A1 for the first segment 32 and along the second axis A2 for the second segment 38, i.e., the opposite walls extend along the movement path of the links, as will be described later. The guide element 33 is stationary relative to the first mold part 4.

It should be noted that the ejection plate 16 is translatable relative to the first segment 32. To that end, the ejection plate 16 comprises a cavity 43 arranged to receive the two first profiles 34 of the first segment 32. This cavity 43 is able to slide around the first segment 32, which makes it possible to move the ejection plate 16 between its retracted position and its ejection position, as will be described later.

The transfer device further comprises at least two articulated links 44 connected to one another and one of which is connected to the pushing device 14 and the other of which is connected to the ejection element 28. The links 44 are translatable relative to one another and relative to the pushing device 14 and the ejection element 28. The translation of the links 44 relative to one another is done along sliding surfaces 46 and relative to the pushing device 14 and the ejection element 28, the sliding surfaces 46 being substantially parallel to one another. Thus, each link 44 comprises a first sliding surface 46 forming a translation surface with a first adjacent link 44 and a second sliding surface 46 forming a translation surface with a second adjacent link 44. The length of the sliding surfaces 46 is such that the links 44 do not disengage from one another when the ejection device moves between its retracted position and its ejection position. Furthermore, these sliding surfaces 46 are sufficient to be able to transmit the pushing forces from the ejection plate 16 to the ejection element 28.

Each guide surface 46 forms an angle β with a direction perpendicular to the first axis A1, as shown in FIGS. 11 to 15, the adjustment of the angle β relative to the first axis A1 makes it possible to adjust the advance or delay in the movement of the ejection element 28 relative to the movement of the pushing device 14, as will be described later.

The number of links 44 of the transfer device 26 depends on the path followed by the links 44 in the guide element 30 and is arranged so that the links connect the pushing device 14 to the ejection element 28. More particularly, the links 44 connect an actuating link 48 secured to the ejection plate 16 to the upstream end of the actuating rod 31.

The actuating link 48 is formed by first and second sub-links 50 and 52. The first sub-link 50 is secured in translation with the ejection plate 16 and is translatable along the first axis A1. The second sub-link 52 is articulated to the first sub-link 50 and comprises a guide surface 46 intended to be connected to a link 44 of the transfer device 26, as shown in FIGS. 5 and 6. The second sub-link 52 is thus rotatable relative to the first sub-link 50 around an axis substantially perpendicular to the plane containing the first axis A1 and the second axis A2.

The transfer device 26 may comprise more than two links 44, including two end links respectively connected to the actuating link 48 secured to the ejection plate 16 and the upstream end of the actuating rod 31, and at least one intermediate link connected to the two end links or several intermediate links successively connected to one another so as to form a chain of links 44 extending in the guide element 30 between the actuating link 48 and the actuating rod 31.

All of the links 44 are identical, i.e., they have an identical shape and structure, whether they are end links or intermediate links.

Several link 44 shapes may be considered, as will be described later. However, these shapes are suitable for cooperating with one another and with the guide element 30 over the entire movement path of the links 44 such that the links 44 are guided in the guide element 30 over the entire movement path.

To that end, each link 44 comprises at least one guide surface 54 arranged to cooperate with the first guide groove 36 and with the second guide groove 42 over the entire movement path of the links. "Cooperate" means that the guide surface 54 is in sliding, gliding and/or rolling contact with one of the guide grooves 36 and 42 over the entire movement path of the link 44 bearing this guide surface 54.

Thus, when the link 44 is in the first segment 32 of the guide element, the guide surface 54 is in contact with at least one surface of the first guide groove 36, and when the link 44 is in the second segment 38, the guide surface 54 is in contact with at least one surface of the second guide groove 42. According to the embodiment shown in FIGS. 1 to 6, the guide surface 54 is formed by a roller 56 having a diameter substantially equal to the width of the guide grooves 36 and 42. The cylindrical peripheral surface of the roller 56 forms the guide surface while being in sliding contact with the walls of one of the guide grooves 36, 42 and at least two points of the surface. According to the embodiment shown in the figures, each link 44 comprises two rollers 56 arranged to respectively cooperate with one of the profiles 34, 40, forming the first segment 32 and the second segment 38. According to one embodiment, the rollers 56 are further rotatable relative to the links, such that the guide surface 54 can also roll on the walls of the guide grooves 36 and 42. Thus, the guiding of the links 44 in the guide element 30 is provided effectively, which avoids any risk of blocking or scratching of the ejection device by blocking of a link 44 in the guide element 30. It should be noted that the guide surface 54 could be defined directly by the shape of the link 44 without requiring the addition of a roller, this shape being able to be arranged to define a sliding contact with the guide element. According to one embodiment, each link 44 comprises two opposite guide surfaces 54 arranged to be in permanent contact with the opposite walls defining the guide grooves 36, 42 of the guide element 30.

To ensure the translational movement of the links relative to one another, with respect to the actuating link 48 secured to the ejection plate 16 and relative to the upstream end of the actuating rod 31, each link 44 comprises two sliding surfaces 46, each formed by a wall of the link 44. The walls forming the sliding surfaces can be arranged in different ways, as will be described by way of example, as long as they are complementary and allow a translational movement relative to one another. According to the embodiment shown in FIGS. 1 to 6, each link 44 has, in a plane containing the first axis A1 and the second axis A2, an S-shaped section, as more particularly shown in FIG. 6. Thus, each link 44 comprises two outer branches and one inner branch connected to one another so as to define two slots 58, each extending between the inner branch and one of the outer branches and opening in two opposite directions. The opposite walls of the outer branches and the inner branch each define a sliding surface 46. Thus, as shown in FIG. 6, each link comprises six sliding surfaces 46a, 46b, 46c, 46d, 46e and 46f defined by the opposite walls of each slot 58 and by the outer surfaces of the outer branches of the link 44. Such an embodiment makes it possible to ensure a robust connection between the links 44, since each link 44 is maintained in two slots 58 of adjacent links 44. In this case, the sub-link 52 of the actuating link 48 and the upstream end of the actuating rod 31 each comprise a complementary slot making it possible to receive the sliding surface 46 of the end links.

According to the embodiment shown in FIGS. 7 and 8, each link 44 has, in a plane containing the first axis A1 and the second axis A2, a C-shaped section. The sliding surfaces 46 are formed by the opposite walls of each branch of the C. In this case, as shown in FIG. 7, each link 44 comprises four sliding surfaces 46a, 46b, 46c and 46d defined by the opposite walls of the two branches of the C and by the outer walls of these branches. Thus, each link is in contact with two adjacent links 44, each branch of the C defining two sliding surfaces 46, one being in contact with one link 44 and the other in contact with another link 44, as shown in FIG. 8. According to this embodiment, each link 44 comprises two guide surfaces 54, for example formed by the flank connecting the two branches of the C.

According to the embodiment shown in FIGS. 9 and 10, each link 44 comprises a slot 60 and a lug 62, the lug 62 having a shape complementary to that of the slot 60. The sliding surfaces 46 are defined by the inner surfaces of the slot 60 and by the outer surfaces of the lug 62. Thus, as shown in FIG. 9, each link 44 comprises six sliding surfaces 46. The slot 60 of one link 44 is thus arranged to receive the lug 62 of an adjacent link, as shown in FIG. 10. Such an embodiment ensures a robust connection between the links 44 and guiding in the sliding of the links relative to one another. In this embodiment, the guide surfaces 54 of each link 44 are for example formed by the outer walls of the slot 60. According to one embodiment that is not shown, each link 44 comprises a slot and a lug that are similar to those shown in FIGS. 9 and 10. In this embodiment, the guide surfaces 54 of each link 44 are spherical. In this embodiment, the guide element then has a hollow tubular shape. Thus, the two first profiles 34 and the two second profiles 40 are advantageously each replaced by a hollow tube in which the links 44 move.

It should be noted that in the figures, the sliding surfaces 46 have been shown as being substantially planar. It is, however, understood that these sliding surfaces could also be curved. In this case, the angle $\beta$ is formed between a tangent to a sliding surface and a direction perpendicular to the first axis A1.

It should be noted that, for each shape described above, the sub-link 52 of the actuating link 48 and the upstream end of the actuating rod 31 each include a sliding surface 46 with a shape suitable for ensuring sliding contact with the sliding surfaces 46 of the links 44 described above. Such an embodiment has the advantage of not being very bulky, in particular in a direction perpendicular to the first and second axes A1 and A2.

The sliding between the sliding surfaces 46 and between the links 44 and the guide element 30 can be favored by the materials used to produce the sliding surfaces 46, the guide surfaces 54 and/or the guide grooves 36 and 42 or by a coating of these surfaces and/or walls using a lubricant.

The ejection device may further comprise one or several ejection rods 64 extending in directions parallel to the first axis A1. One of the ends of the ejection rod 64 is secured to the ejection plate 16 and its other end is flush with the molding surface 10 in the retracted position of the ejection device and forms part of the molding surface 10, as shown in FIGS. 1 and 2. The ejection rod(s) 64 are arranged to allow the molded part 2 to be ejected along the opening direction of the mold, as will now be described.

The operation of the ejection device described above will now be described.

During the molding of the part, the mold is in the closed position and the ejection device is in the retracted position, in which the ejection plate 16 is found in the upstream part 20 of the space 18, the ejection rod 64 is flush with the molding surface 10, and in which, according to the embodiment shown in the figures, the ejection element 28 defines, with the first part 4, the secondary molding cavity by its secondary molding surface 12.

Once the part has been produced, the mold is opened by separating the first and second mold parts from one another along the opening direction D. During or after this opening, the ejection device is actuated to go from its retracted position to its ejection position.

To that end, the ejection plate 16 is actuated to move in the space 18 toward the downstream part 22 of this space 18, as shown in FIG. 3. During this movement, the ejection plate 16 moves along the first axis A1 by sliding around the first segment 32 of the guide element 30, this first segment 32 penetrating the cavity 43 of the ejection plate provided to that end.

The movement of the ejection plate causes the movement of the ejection rod 64 along a direction parallel to the first axis, which separates the molded part 2 from the molding surface 10 in this direction, as shown in FIG. 3.

Furthermore, the movement of the ejection plate causes the movement of the actuating link 48 along the first axis A1, which in turn drives the movement of the links 44 in the guide element 30, the links 44 driving the movement of the ejection element 28.

As shown in FIG. 1, in the retracted position, the links 44 are initially in the first segment 32 of the guide element 30. The movement of the ejection plate 16 drives a movement along the first axis A1 of the links 44, which gradually engage in the second segment 38 and change direction to move along the second axis A2, as shown in FIG. 3. This change of direction is possible through the sliding of the sliding surfaces 46 of the links 44 relative to one another.

The movement of the links 44 along the second axis A2 causes a movement along this axis by the actuating rod 31 and the moving block. Due to the angle α between the first axis A1 and the second axis A2, the movement of the moving block causes the moving block to slide outside the undercut portion 6, as shown in FIG. 3, which makes it possible to strip this portion. It should be noted that by adapting the value of the angle β, it is possible to delay or accelerate the movement of the moving block outside the undercut portion 6 relative to the movement of the pushing device 14. In other words, for a movement at a given speed by the pushing device along the first axis A1, the moving block will move at a higher speed, in the case of an accelerated movement, or lower speed, in the case of a delayed movement, with respect to this given speed. The acceleration or delay of the movement of the moving block relative to the pushing device 14 makes it possible to synchronize the movement of the moving block with that of the ejection rod(s) 64 so that the moving block and the ejection rods 64 reach the ejection position at the same time, even though the ejection paths are different.

Figure 11:
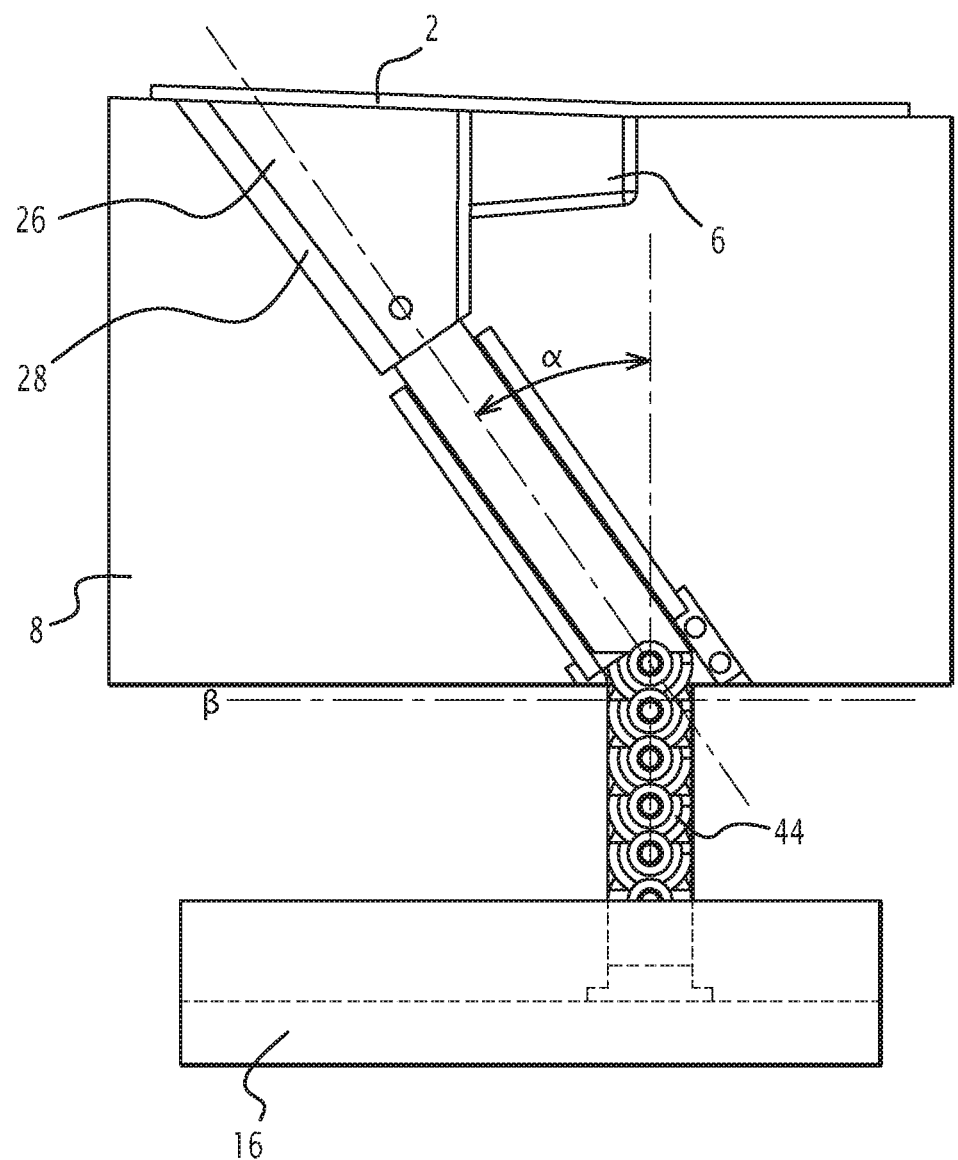

In FIG. 11, the angle α is substantially equal to 30° and the angle β is zero. In this case, the moving block moves at the same speed as the pushing device 14.

Figure 12:
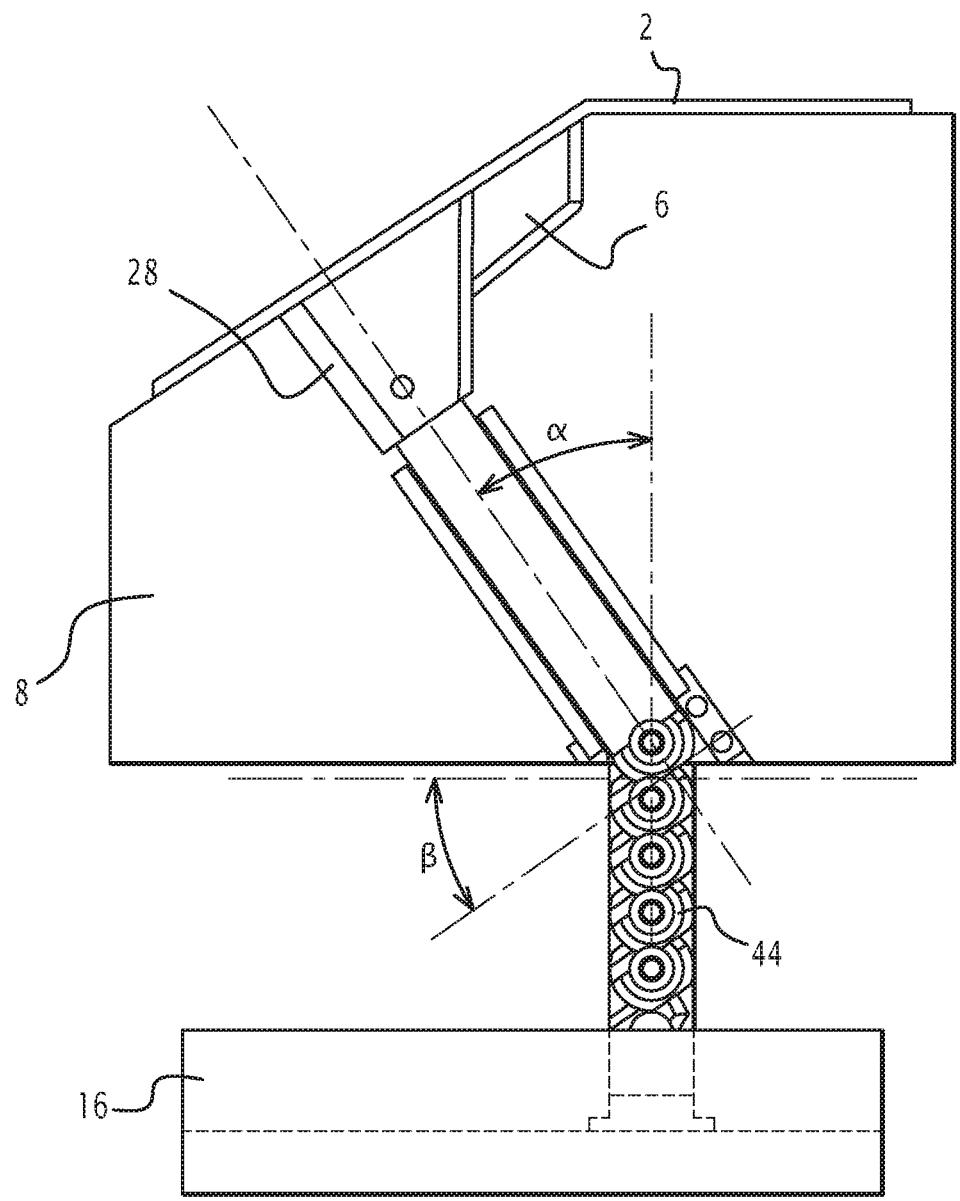

In FIG. 12, the angle α is substantially equal to 35° and the angle β is substantially equal to −35°. In this case, the moving block moves at a lower speed than the movement speed of the pushing device 14.

Figure 13:
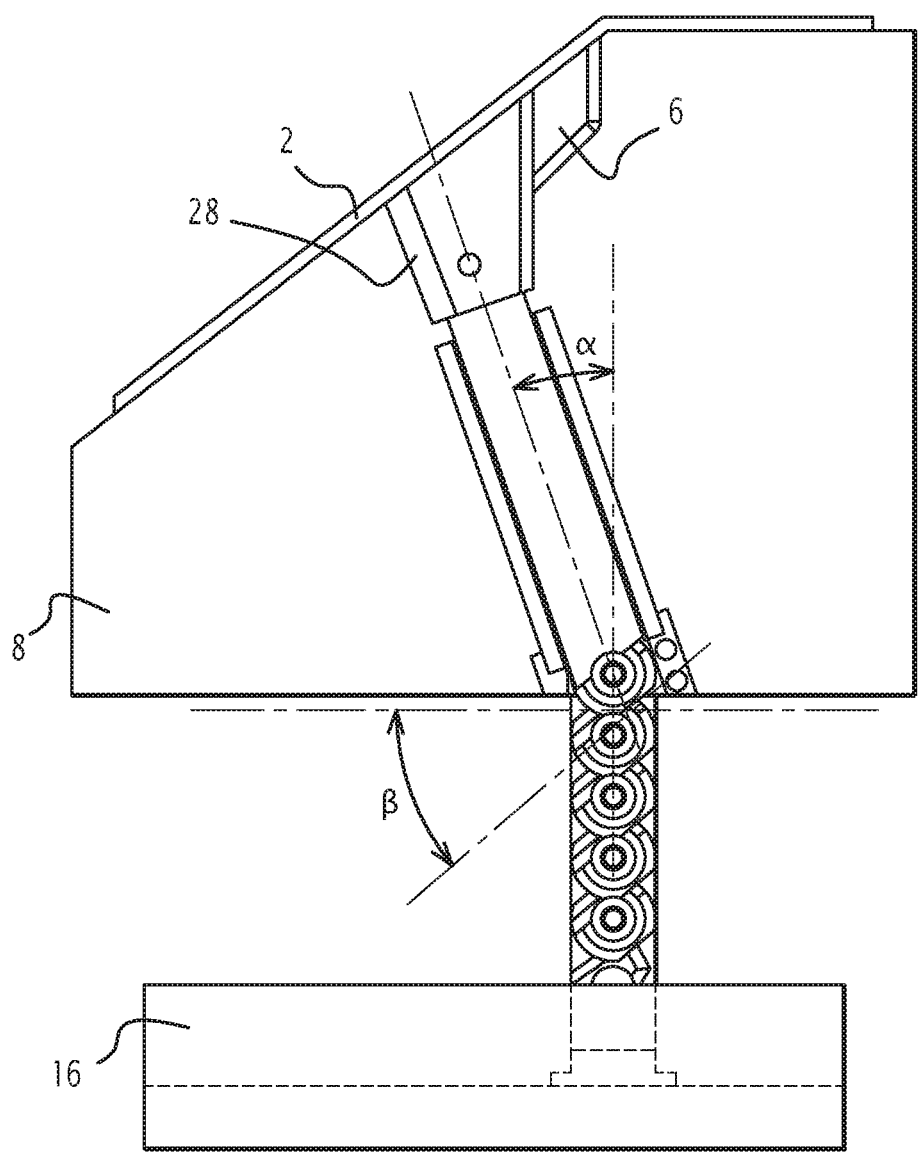

In FIG. 13, the angle α is substantially equal to 20° and the angle β is substantially equal to −40°. In this case, the moving block moves at a lower speed than the movement speed of the pushing device 14.

Figure 14:
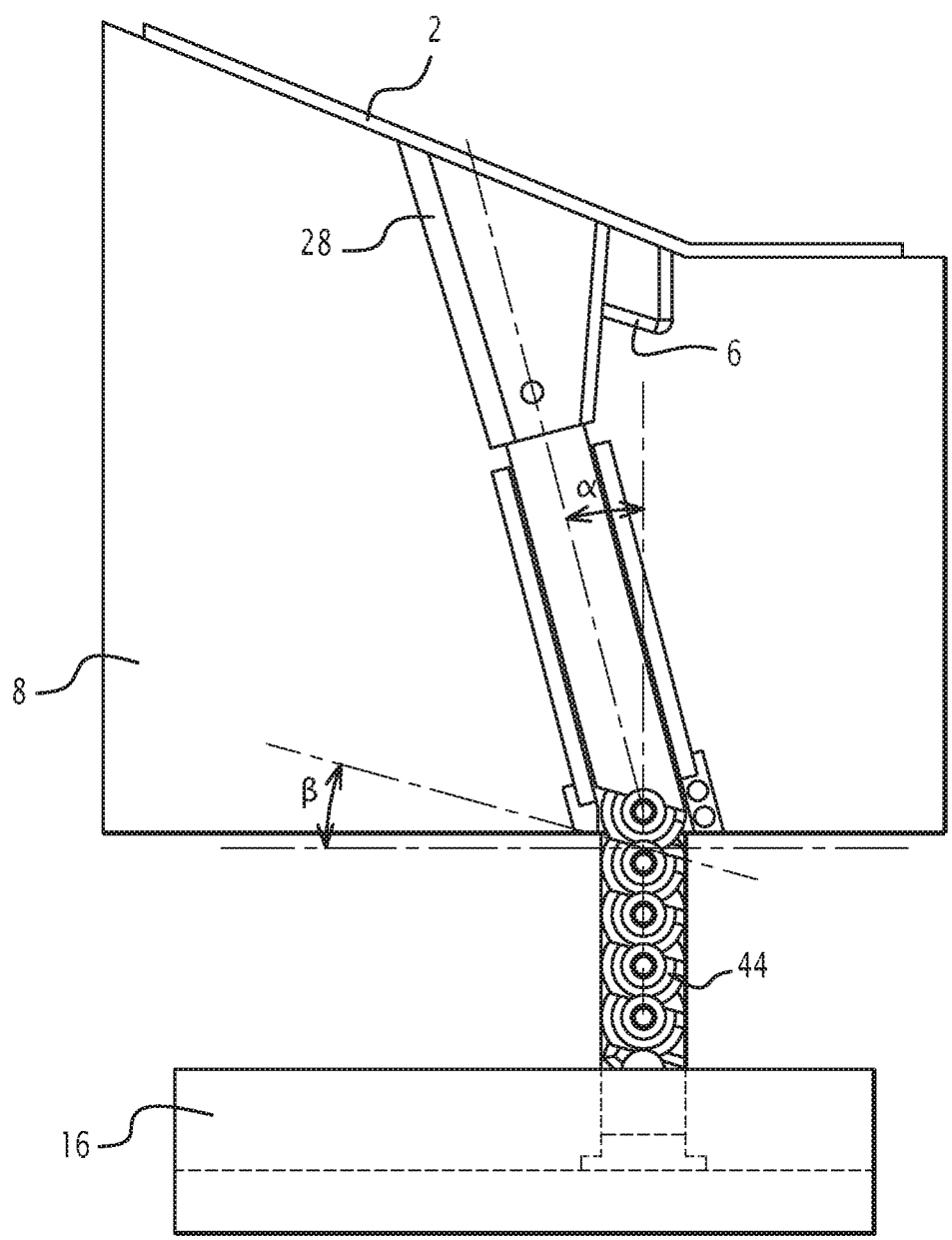

In FIG. 14, the angle α is substantially equal to 15° and the angle β is substantially equal to 20°. In this case, the moving block moves at a higher speed than the movement speed of the pushing device 14.

Figure 15:
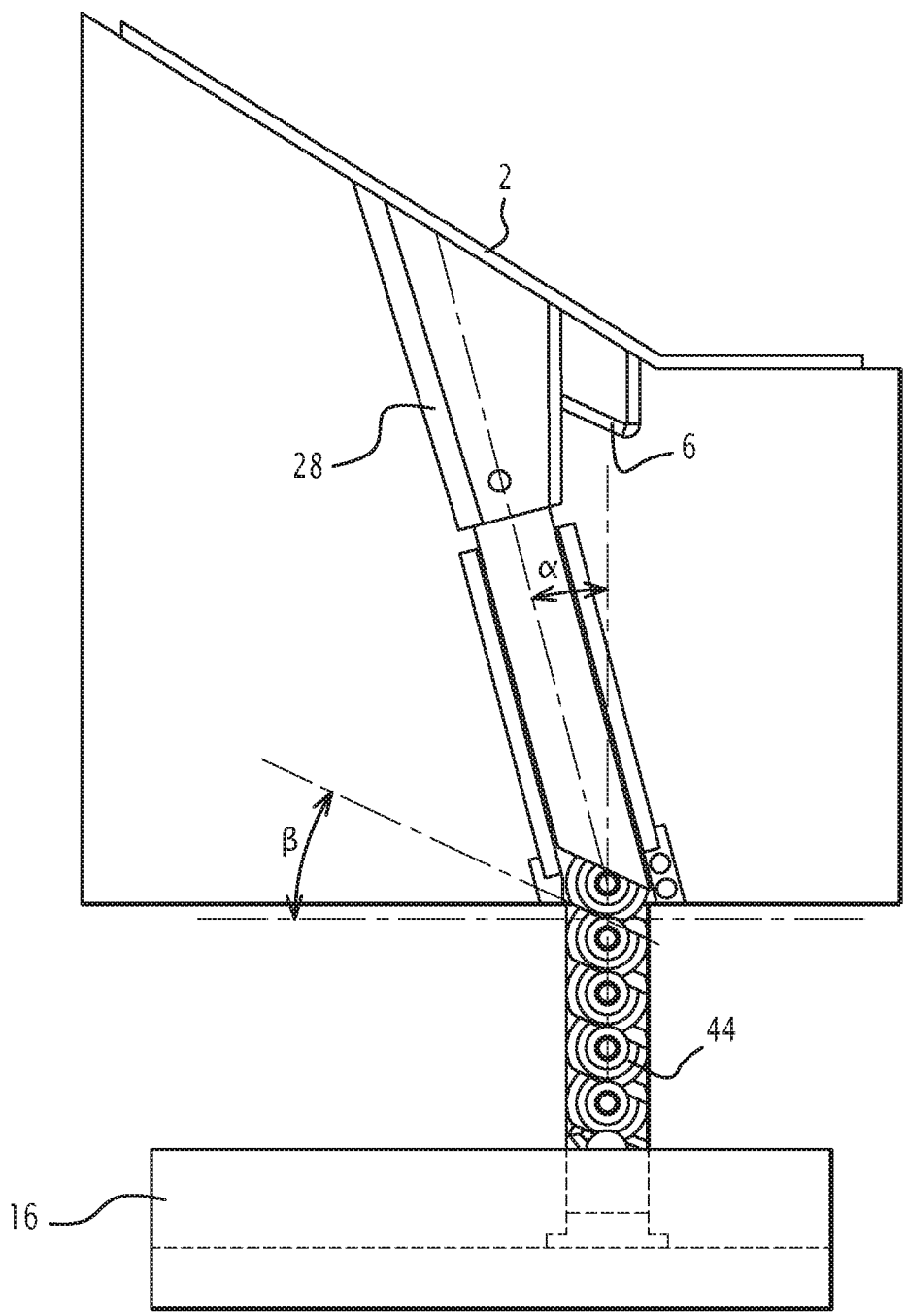

In FIG. 15, the angle α is substantially equal to 15° and the angle β is substantially equal to 30°. In this case, the moving block moves at a higher speed than the movement speed of the pushing device 14.

It will thus be understood by choosing a negative angle β, the movement of the moving block is delayed, and by choosing a positive angle β, the movement of the moving block is accelerated.

When the ejection plate reaches its ejection position, in which it is for example in contact with the upper wall of the space 18 of the first part 4, as shown in FIG. 4, the molded part 2 is completely separated from the molding surface 10 and the moving block is completely removed from the undercut portion 6. Thus, the molded part 2 can be removed from the mold without burden and without interference with one of the parts of the mold and the ejection device.

The ejection device described above therefore makes it possible to eject large molded parts and/or molded parts with complex shapes without weakening the first part of the mold. Furthermore, the transfer device can be used to adapt the ejection device to the shape of the molded part 2. The chain of links can be modified easily by adding or removing links 44, which are all identical and interchangeable. Furthermore, the angle α between the first axis A1 and the second axis A2 can be modified by simply changing an interface part 66 inserted between the first segment 32 and the second segment 38. This interface part 66 makes it possible to incline the second segment 38 more or less relative to the first segment 32. Thus, elements shared by the ejection device, such as the links 44, the actuating rod 31, the first and second profiles 34 and 40, the ejection plate 16 and the ejection rod(s) 64 can be used for different molds. It suffices to change only the moving block when the shape of the secondary molding surface 12 must be modified and/or the interface part 66 when the angle α must be modified.

The ejection device described above could be modified in various ways while remaining compliant with the invention. Thus, as an example, the ejection device could not comprise a secondary molding surface and be used only to separate the molded part 2 from the molding surface 10, in particular when the main surface 4 of the molded part has portions extending in different directions from a direction substantially perpendicular to the opening direction. The links 44 could also be formed by simple slabs, the outer surfaces of which form the sliding and guide surfaces. In such an embodiment, the links 44 are not directly connected to one another and are in simple sliding contact relative to one another.

Moreover, it is understood that the mold could comprise several second ejection element 28 and several corresponding transfer devices 26 in order to allow the molding and ejection of several undercut portions 6 and/or the ejection of several portions with a complex shape of the main surface 2. In this case, a single ejection plate 16 bearing several actuating links 48 can be provided to actuate all of the second ejection elements 28 simultaneously.

The invention claimed is:

1. An ejection device for a mold used to produce a molded part in a molding cavity intended to allow the ejection of the molded part outside said molding cavity, said device comprising:
   a pushing device translatable along a first axis between a retracted position and an ejection position,
   an ejection element translatable along a second axis, different from the first axis, between a retracted position and an ejection position, and
   a transfer device connecting the pushing device and the ejection element, said transfer device being arranged to move the ejection element along the second axis between its retracted position and its ejection position when the pushing device is moved along the first axis between its retracted position and its ejection position, wherein the transfer device comprises two links, translatable relative to one another and relative to the pushing device and the ejection element, and wherein the links of the transfer device transmit movement of the pushing device to the election element.

2. The ejection device according to claim 1, wherein the transfer device comprises a guide element receiving said links, said links being moved along a movement path in said guide element by the pushing device and moving the ejection element, said links being guided in said guide element over the entire movement path.

3. The ejection device according to claim 2, wherein the guide element comprises opposite walls each extending over the movement path.

4. The ejection device according to claim 3, wherein at least one of the two links comprises two opposite guide surfaces, said guide surfaces respectively being in permanent contact with the opposite walls of the guide element over the entire movement path such that the links are guided in said guide element over the entire movement path.

5. The ejection device according to claim 1, wherein the two links are identical to one another.

6. The ejection device according to claim 1, wherein the second axis forms a non-zero angle with the first axis.

7. The ejection device according to claim 1, wherein at least one of the two links comprises a first sliding surface forming a translation surface with a first adjacent link and a second sliding surface forming a translation surface with a second adjacent link.

8. The ejection device according to claim 7, wherein each sliding surface forms an angle relative to a direction perpendicular to the first axis, said angle being negative to delay the movement of the ejection element relative to the pushing device or positive to accelerate the movement of the ejection element relative to the pushing device or zero to move the ejection element and the pushing device at the same speed.

9. The ejection device according to claim 1, wherein the ejection element comprises a secondary molding surface arranged to form part of the molding cavity and to mold a portion of the molded part, the movement of the ejection element in the ejection position causing the separation of the secondary molding surface from the portion of the molded part molded by said secondary molding surface.

10. The ejection device according to claim 1, wherein the pushing device comprises an ejection plate translatable along a direction parallel to the first axis, said ejection device further comprising an ejection rod secured to the ejection plate and arranged to move the molded part along said direction parallel to the first axis.

11. An ejection device for a mold used to produce a molded part in a molding cavity intended to allow the ejection of the molded part outside said molding cavity, said device comprising:

a pushing device translatable along a first axis between a retracted position and an ejection position, an ejection element translatable along a second axis, different from the first axis, between a retracted position and an ejection position, and a transfer device connecting the pushing device and the ejection element, said transfer device being arranged to move the ejection element along the second axis between its retracted position and its ejection position when the pushing device is moved along the first axis between its retracted position and its ejection position, wherein the transfer device comprises two links, translatable relative to one another and relative to the pushing device and the ejection element, wherein the transfer device comprises a guide element receiving said links, said links being moved along a movement path in said guide element by the pushing device and moving the ejection element, said links being guided in said guide element over the entire movement path, wherein the guide element comprises opposite walls each extending over the movement path, and wherein at least one of the two links comprises two opposite guide surfaces, said guide surfaces respectively being in permanent contact with the opposite walls of the guide element over the entire movement path such that the links are guided in said guide element over the entire movement path.

12. The ejection device according to claim 11, wherein the second axis forms a non-zero angle with the first axis.

13. The ejection device according to claim 11, wherein each link comprises a first sliding surface forming a translation surface with a first adjacent link and a second sliding surface forming a translation surface with a second adjacent link.

14. The ejection device according to claim 11, wherein the ejection element comprises a secondary molding surface arranged to form part of the molding cavity and to mold a portion of the molded part, the movement of the ejection element in the ejection position causing the separation of the secondary molding surface from the portion of the molded part molded by said secondary molding surface.

15. The ejection device according to claim 11, wherein the pushing device comprises an ejection plate translatable along a direction parallel to the first axis, said ejection device further comprising an ejection rod secured to the ejection plate and arranged to move the molded part along said direction parallel to the first axis.

16. An ejection device for a mold used to produce a molded part in a molding cavity intended to allow the ejection of the molded part outside said molding cavity, said device comprising:

a pushing device translatable along a first axis between a retracted position and an ejection position, an ejection element translatable along a second axis, different from the first axis, between a retracted position and an ejection position, and a transfer device connecting the pushing device and the ejection element, said transfer device being arranged to move the ejection element along the second axis between its retracted position and its ejection position when the pushing device is moved along the first axis between its retracted position and its ejection position, wherein the transfer device comprises two links, translatable relative to one another and relative to the pushing device and the ejection element, wherein at least one of the two links comprises a first sliding surface forming a translation surface with a first adjacent link and a second sliding surface forming a translation surface with a second adjacent link, and wherein each sliding surface forms an angle relative to a direction perpendicular to the first axis, said angle being negative to delay the movement of the ejection element relative to the pushing device or positive to accelerate the movement of the ejection element relative to the pushing device or zero to move the ejection element and the pushing device at the same speed.

17. The ejection device according to claim 16, wherein the transfer device comprises a guide element receiving said links, said links being moved along a movement path in said guide element by the pushing device and moving the ejection element, said links being guided in said guide element over the entire movement path.

18. The ejection device according to claim 16, wherein the second axis forms a non-zero angle with the first axis.

19. The ejection device according to claim 16, wherein the ejection element comprises a secondary molding surface arranged to form part of the molding cavity and to mold a portion of the molded part, the movement of the ejection element in the ejection position causing the separation of the secondary molding surface from the portion of the molded part molded by said secondary molding surface.

20. The ejection device according to claim 16, wherein the pushing device comprises an ejection plate translatable along a direction parallel to the first axis, said ejection device further comprising an ejection rod secured to the ejection plate and arranged to move the molded part along said direction parallel to the first axis.

* * * * *